(12) United States Patent
Bhuiyan et al.

(10) Patent No.: US 11,511,566 B2
(45) Date of Patent: Nov. 29, 2022

(54) SHEAR BAND

(71) Applicant: The Goodyear Tire & Rubber Company, Akron, OH (US)

(72) Inventors: Md Atiqur Rahman Bhuiyan, Copley, OH (US); Jimmy Lee Richards, Rootstown, OH (US); Gregory Monroe Bond, Akron, OH (US); Christopher Edward Estafen, Bedford, OH (US); Francesco Sportelli, Bettembourg (LU); Marc Borowczak, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 198 days.

(21) Appl. No.: 16/709,165

(22) Filed: Dec. 10, 2019

(65) Prior Publication Data
US 2021/0170796 A1   Jun. 10, 2021

(51) Int. Cl.
*B60C 9/18* (2006.01)
*B60C 9/20* (2006.01)

(52) U.S. Cl.
CPC ........ *B60C 9/20* (2013.01); *B60C 2009/1871* (2013.01); *B60C 2009/2019* (2013.01)

(58) Field of Classification Search
CPC ....... B60C 9/1807; B60C 9/1821; B60C 9/26; B60C 9/263; B60C 2009/1814; B60C 2009/1828; B60C 2009/266; B60C 2009/1871
See application file for complete search history.

(56) References Cited

U.S. PATENT DOCUMENTS

| | | |
|---|---|---|
| 3,730,244 A | 5/1973 | Ross |
| 3,842,885 A | 10/1974 | Alban |
| 4,459,167 A | 7/1984 | Markow et al. |
| 4,573,510 A | 3/1986 | Ippen et al. |
| 4,585,035 A * | 4/1986 | Piccoli ............ F16L 11/086 138/127 |
| 4,600,651 A | 7/1986 | Aufdermarsh et al. |

(Continued)

FOREIGN PATENT DOCUMENTS

EP   0092498 A3   10/1984

OTHER PUBLICATIONS

European Search Report for Serial No. EP20212575 dated Mar. 15, 2021.

*Primary Examiner* — Justin R Fischer
(74) *Attorney, Agent, or Firm* — June E. Rickey; Robert N. Lipcsik

(57) ABSTRACT

A shear band for a tire includes a first belt layer extending circumferentially around the tire, a second belt layer extending circumferentially around the tire, and a shear band radially interposed between the first belt layer and the second belt layer. The shear band includes a first reinforcing ply radially adjacent the first belt layer, a third reinforcing ply radially adjacent the second belt layer, and a second reinforcing ply radially interposed between the first reinforcing ply and the second reinforcing ply. The first reinforcing ply includes a first flattened, braided tube layer enclosed by a first rubber layer. The second reinforcing ply includes a second flattened, braided tube layer enclosed by a second rubber layer. The third reinforcing ply includes a third flattened, braided tube layer enclosed by a third rubber layer.

9 Claims, 5 Drawing Sheets

(56) References Cited

U.S. PATENT DOCUMENTS

| | | |
|---|---|---|
| 4,601,941 A | 7/1986 | Lutz et al. |
| 4,698,278 A | 10/1987 | Prang |
| 4,734,144 A | 3/1988 | Markow |
| 4,869,307 A | 9/1989 | Bormann et al. |
| 5,004,031 A | 4/1991 | Kadota et al. |
| 5,096,772 A | 3/1992 | Snyder |
| 5,503,940 A | 4/1996 | Majumdar et al. |
| 5,804,002 A | 9/1998 | Nakano |
| 5,837,077 A | 11/1998 | Kabe et al. |
| 6,321,808 B1 | 11/2001 | Spragg et al. |
| 6,460,586 B1 | 10/2002 | Spragg et al. |
| 6,598,634 B1 | 7/2003 | Koch et al. |
| 6,669,793 B2 | 12/2003 | Hays |
| 6,769,465 B2 | 8/2004 | Rhyne et al. |
| 6,994,134 B2 | 2/2006 | Grah |
| 7,013,939 B2 | 3/2006 | Rhyne et al. |
| 7,201,194 B2 | 4/2007 | Rhyne et al. |
| 7,678,216 B2 | 3/2010 | Sandstrom et al. |
| 8,215,351 B2 | 7/2012 | Thompson |
| 8,813,797 B2 | 8/2014 | Anderson et al. |
| 9,272,576 B2 | 3/2016 | Dotson et al. |
| 10,071,603 B2 | 9/2018 | Sportelli et al. |
| 10,105,989 B2 | 10/2018 | Cron et al. |
| 2010/0018621 A1 | 1/2010 | Thompsom |
| 2011/0253281 A1 | 10/2011 | Christenbury |
| 2016/0121663 A1 | 5/2016 | Sportelli et al. |
| 2017/0008342 A1 | 1/2017 | Martin et al. |
| 2017/0297374 A1 | 10/2017 | Sportelli |
| 2018/0029422 A1 | 2/2018 | Thompson |
| 2018/0141380 A1 | 5/2018 | Celik |
| 2018/0154694 A1 | 6/2018 | Orlewski et al. |
| 2019/0016076 A1 | 1/2019 | Rivers et al. |
| 2019/0283500 A1 | 9/2019 | Wilson et al. |
| 2019/0322137 A1 | 10/2019 | Wilson et al. |

\* cited by examiner

SHEAR BAND

FIELD OF THE INVENTION

The present invention provides an improved shear band for use in non-pneumatic tires, pneumatic tires, and/or other technologies.

BACKGROUND OF THE INVENTION

One conventional example relates to a structurally supported resilient tire supporting a load without internal air pressure. This non-pneumatic tire includes a ground contacting portion and side wall portions that extend radially inward from the tread portion and anchor in bead portions adapted to remain secure to a wheel during rolling of the wheel/tire. A reinforced annular shear band is disposed radially inward of the tread portion. This shear band includes at least one shear layer, a first membrane adhered to the radially inward extent of the shear layer and a second membrane adhered to the radially outward extent of the shear layer. Each of the membranes has a longitudinal tensile modulus sufficiently greater than the dynamic shear modulus of the shear layer so that, when under load, the ground contacting portion of the tire deforms to a flat contact region through shear strain in the shear layer while maintaining constant length of the membranes. Relative displacement of the membranes occurs substantially by shear strain in the shear layer.

Another conventional non-pneumatic tire includes an outer annular shear band and a plurality of web spokes that extend transversely across and radially inward from the shear band and are anchored in a wheel or hub. The shear band may comprise an annular shear layer, a first membrane adhered to the radially inward extent of the shear layer, and a second membrane adhered to the radially outward extent of the shear layer. Under load, this shear band deforms in the contact area with the ground surface through a mechanism that includes shear deformation of the shear band.

As described above, a shear band may provide desirable performance benefits in a tire. As described below, the shear band in accordance with the present invention may further enhance performance capabilities of the tire. This improved construction for the shear band may have application in pneumatic tires, nonpneumatic tires, and other products as well.

SUMMARY OF THE INVENTION

A shear band for a tire in accordance with the present invention includes a first belt layer extending circumferentially around the tire, a second belt layer extending circumferentially around the tire, and a shear band radially interposed between the first belt layer and the second belt layer. The shear band includes a first reinforcing ply radially adjacent the first belt layer, a third reinforcing ply radially adjacent the second belt layer, and a second reinforcing ply radially interposed between the first reinforcing ply and the second reinforcing ply. The first reinforcing ply includes a flattened, braided tube layer enclosed by a first rubber layer. The second reinforcing ply includes a second flattened, braided tube layer enclosed by a second rubber layer. The third reinforcing ply includes a flattened, braided tube layer enclosed by a third rubber layer.

According to another aspect of the shear band, the first flattened, braided tube layer includes a structure angled between −45 degrees and −35 degrees relative to the equatorial plane of the tire.

According to still another aspect of the shear band, the second flattened, braided tube layer includes a structure angled between −5 degrees and +5 degrees relative to the equatorial plane of the tire.

According to yet another aspect of the shear band, the third flattened, braided tube layer includes a structure angled between +35 degrees and +45 degrees relative to the equatorial plane of the tire.

According to still another aspect of the shear band, the first rubber layer includes cords angled between +35 degrees and +45 degrees relative to the equatorial plane of the tire.

According to yet another aspect of the shear band, the second rubber layer includes cords angled between −5 degrees and +5 degrees relative to the equatorial plane of the tire.

According to still another aspect of the shear band, the third rubber layer includes cords angled between −45 degrees and −35 degrees relative to the equatorial plane of the tire.

According to yet another aspect of the shear band, the first belt layer includes metal cords angled between +35 degrees and +45 degrees relative to the equatorial plane of the tire.

According to still another aspect of the shear band, the second belt layer includes metal cords angled between +35 degrees and +45 degrees relative to the equatorial plane of the tire.

According to yet another aspect of the shear band, the first belt layer and the second belt layer both include metal cords angled between −5 degrees and +5 degrees relative to the equatorial plane of the tire.

A method constructs a belt package for a tire. The method includes the steps of: enclosing flattened, braided tube layers with rubber layers; orienting the flattened, braided tube layers and rubber layers relative to an equatorial plane of the tire; enclosing all of the flattened, braided tube layers with a fabric layer to form a shear band coupon; orienting the shear band coupon radially between a first belt layer and a second belt layer; and curing the first belt layer, the shear band coupon, and the second belt layer to form a complete belt package.

According to another aspect of the method, a further step includes angling a first flattened, braided tube layer of the shear band coupon between −45 degrees and −35 degrees relative to the equatorial plane of the tire.

According to still another aspect of the method, a further step includes angling a second flattened, braided tube layer of the shear band coupon between −5 degrees and +5 degrees relative to the equatorial plane of the tire.

According to yet another aspect of the method, a further step includes angling a third flattened, braided tube layer of the shear band coupon between +35 degrees and +45 degrees relative to the equatorial plane of the tire.

According to still another aspect of the method, a further step includes positioning a first rubber layer of the shear band coupon with cords angled between +35 degrees and +45 degrees relative to the equatorial plane of the tire.

According to yet another aspect of the method, a further step includes positioning a second rubber layer of the shear band coupon with cords angled between −5 degrees and +5 degrees relative to the equatorial plane of the tire.

According to still another aspect of the method, a further step includes positioning a third rubber layer of the shear band coupon with cords angled between −45 degrees and −35 degrees relative to the equatorial plane of the tire.

According to yet another aspect of the method, a further step includes angling cords of the first belt layer between −5 degrees and +5 degrees relative to the equatorial plane of the tire.

According to still yet another aspect of the method, a further step includes angling cords of the second belt layer between −5 degrees and +5 degrees relative to the equatorial plane of the tire.

According to yet another aspect of the method, a further step includes angling reinforcing cords of both the first belt layer and the second belt layer between −5 degrees and +5 degrees relative to the equatorial plane of the tire.

Definitions

As used herein and in the claims:

"Apex" means an elastomeric filler located radially above the bead core and between the plies and the turnup ply.

"Annular" means formed like a ring.

"Aramid" and "Aromatic polyamide" both mean a manufactured fiber in which the fiber-forming substance is generally recognized as a long chain of synthetic aromatic polyamide in which at least 85% of the amide linkages are attached directly to the two aromatic rings. Representative of an aramid or aromatic polyamide is a poly (p-phenylene-terephthalamide).

"Aspect ratio" means the ratio of a tire section height to its section width. For example, the aspect ratio may be the maximum axial distance between the exterior of the tire sidewalls when unloaded and inflated at normal pressure, multiplied by 100% for expression as a percentage. Low aspect ratio may mean a tire having an aspect ratio of 65 and below.

"Aspect ratio of a bead cross-section" means the ratio of a bead section height to its section width.

"Asymmetric tread" means a tread that has a tread pattern not symmetrical about the centerplane or equatorial plane (EP) of the tire.

"Axial" and "axially" refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane (EP) of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane (EP) of the tire. If multiple plies are present, the ply cords run at opposite angles in alternating layers.

"Braided tube" means a tubular structure including a cord/filament/strand/strip with usually three or more component strands forming a regular diagonal pattern down its length. The tube structure may be a narrow, ropelike band formed by plaiting or weaving together several strands. Braiding may result in an interlaced fabric tube with crossing strips laid together in diagonal formation thereby forming a narrow strip of tubular fabric, which may be flattened to form a flattened tube strip and/or layer.

"Breakers" means at least two annular layers or plies of parallel reinforcement cords having the same angle with reference to the equatorial plane (EP) of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls, and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Composite", as used herein, means constructed from two or more layers.

"Cord" means one of the reinforcement strands of which the reinforcement structures of the tire are comprised.

"Cord angle" means the acute angle, left or right in a plan view of the tire, formed by a cord with respect to the equatorial plane (EP). The "cord angle" is measured in a cured but uninflated tire.

"Cord twist" means each yarn of the cord has its component filaments twisted together a given number of turns per unit of length of the yarn (usually expressed in turns per inch (TPI) or turns per meter (TPM)) and additionally the yarns are twisted together a given number of turns per unit of length of the cord. The direction of twist refers to the direction of slope of the spirals of a yarn or cord when it is held vertically. If the slope of the spirals conforms in direction to the slope of the letter "S", then the twist is called "S" or "left hand". If the slope of the spirals conforms in direction to the slope of the letter "Z", then the twist is called "Z" or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord. "dtex" is understood to mean the weight in grams of 10,000 meters of a yarn before the yarn has a twist imparted thereto.

"Cut belt ply" refers to a belt having a width less than the tread width, which lies flat over the carcass plies in the crown area of the tire.

"Crown" means that portion of the tire in the proximity of the tire tread.

"Denier" means the weight in grams per 9000 meters (unit for expressing linear density). "Dtex" means the weight in grams per 10,000 meters.

"Density" means weight per unit length.

"Dynamic shear modulus" means the shear modulus measured per ASTM D5992.

"Elastomer" means a resilient material capable of recovering size and shape after deformation.

"Elongation at break" means the tensile elongation as measured by ASTM D412-98a and conducted at 100° C. rather than ambient.

"Equatorial plane (EP)" means the plane perpendicular to the tire's axis of rotation and passing through the center of its tread; or the plane containing the circumferential centerline of the tread.

"Evolving tread pattern" means a tread pattern, the running surface of which, which is intended to be in contact with the road, evolves with the wear of the tread resulting from the travel of the tire against a road surface, the evolution being predetermined at the time of designing the tire, so as to obtain adhesion and road handling performances which remain substantially unchanged during the entire period of use/wear of the tire, no matter the degree of wear of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made, that forms the basic element of filaments; characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High tensile steel (HT)" means a carbon steel with a tensile strength of at least 3400 MPa at 0.20 mm filament diameter.

"Hysteresis" means a dynamic loss tangent (e.g., max tan delta). The dynamic characteristics of the materials are measured on an MTS 831 Elastomer Test System in accordance with ASTM D5992. The response of a sample of vulcanized material (cylindrical test piece of a thickness of 4 mm and a section of 400 mm$^2$), subjected to an alternating single sinusoidal shearing stress, at a frequency of 10 Hz and at 80° C., is recorded. Scanning is conducted at an amplitude of deformation of 0.1 percent to 50 percent (outward cycle), then of 50 percent to 0.1 percent (return cycle). The maximum shear modulus G max in MPa and the maximum value of the tangent of the loss angle tan delta (max tan delta) is determined during the outward cycle.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360° rotation about another filament or strand.

"Load range" means load and inflation limits for a given tire used in a specific type of service as defined by tables in The Tire and Rim Association, Inc.

"Modulus" of a test specimen means the tensile modulus of elasticity at 1 percent elongation in the circumferential direction of the tire multiplied by the effective thickness of the test specimen.

"Mega tensile steel (MT)" means a carbon steel with a tensile strength of at least 4500 MPa at 0.20 mm filament diameter.

"Meridian plane" means a plane parallel to the axis of rotation of the tire and extending radially outward from the axis.

"Net contact area" means the total area of ground contacting elements between defined boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal load" means the specific design inflation pressure and load assigned by the appropriate standards organization for the service condition for the tire.

"Normal tensile steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane (EP) of the tire.

"Radial ply tire" means a belted or circumferentially-restricted pneumatic tire in which at least one ply has cords which extend from bead to bead and the ply is laid at cord angles between 65° and 90° with respect to the equatorial plane (EP) of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section height" means the radial distance from the nominal rim diameter to the outer diameter of the tire at its equatorial plane (EP).

"Section width" means the maximum linear distance parallel to the axis of the tire and between the exterior of its sidewalls when and after it has been inflated at normal pressure for 24 hours, but unloaded, excluding elevations of the sidewalls due to labeling, decoration, or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super tensile steel (ST)" means a carbon steel with a tensile strength of at least 3650 MPa at 0.20 mm filament diameter.

"Tenacity" means stress expressed as force per unit linear density of the unstrained specimen (gm/tex or gm/denier).

"Tensile stress" is force expressed in force/cross-sectional area. Strength in psi=12,800 times specific gravity times tenacity in grams per denier.

"Tension" for a cord means force on the cord expressed as mN/tex.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turns per inch", or TPI, means turns of cord twist for each inch length of cord.

"Turnup end" means the portion of a carcass ply that turns upward (i.e., radially outward) from the beads about which the ply is wrapped.

"Ultra tensile steel (UT)" means a carbon steel with a tensile strength of at least 4000 MPa at 0.20 mm filament diameter.

"Vertical deflection" means the amount that a tire deflects under load.

"Wheel" or "hub" means a structure for supporting the tire and mounting to the vehicle axle.

"Yarn" is a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); and (5) a narrow strip of material with or without twist.

BRIEF DESCRIPTION OF THE DRAWINGS

A full and enabling disclosure of examples of the present invention, directed to one of ordinary skill in the art, is set forth in the specification with reference to the appended figures, in which.

Similar numerals refer to similar parts throughout the drawings.

DETAILED DESCRIPTION OF EXAMPLES OF THE PRESENT INVENTION

Reference will now be made in detail to examples of the present invention, one or more examples of which are illustrated in the figures. Each example is provided by way of explanation of the present invention, and not meant as a limitation of the present invention. For example, features illustrated or described as part of one example may be used with another example to yield still a third example. It is intended that the present invention include these and other modifications and variations. It should be noted that for the purposes of discussion, only half of the example tires may be depicted in one or more of the figures. One of ordinary skill in the art, using the teachings disclosed herein, will understand that the same or substantially similar features may be repeated on both sides of the example tires.

The present invention provides an improved shear band that may be used in a variety of products including, for example, non-pneumatic tires, pneumatic tires, and/or other technologies. The improved shear band may be constructed as a composite comprised of individual layers, which may be, in turn, constructed from certain materials having specific physical properties that, when combined in a particular manner as described herein, may provide overall physical properties and performance characteristics desirably exceeding that which would be obtained from a shear band constructed from only one of the individual materials. By way of example only, improvements in rolling resistance and tire design flexibility may be obtained.

Figure 3:
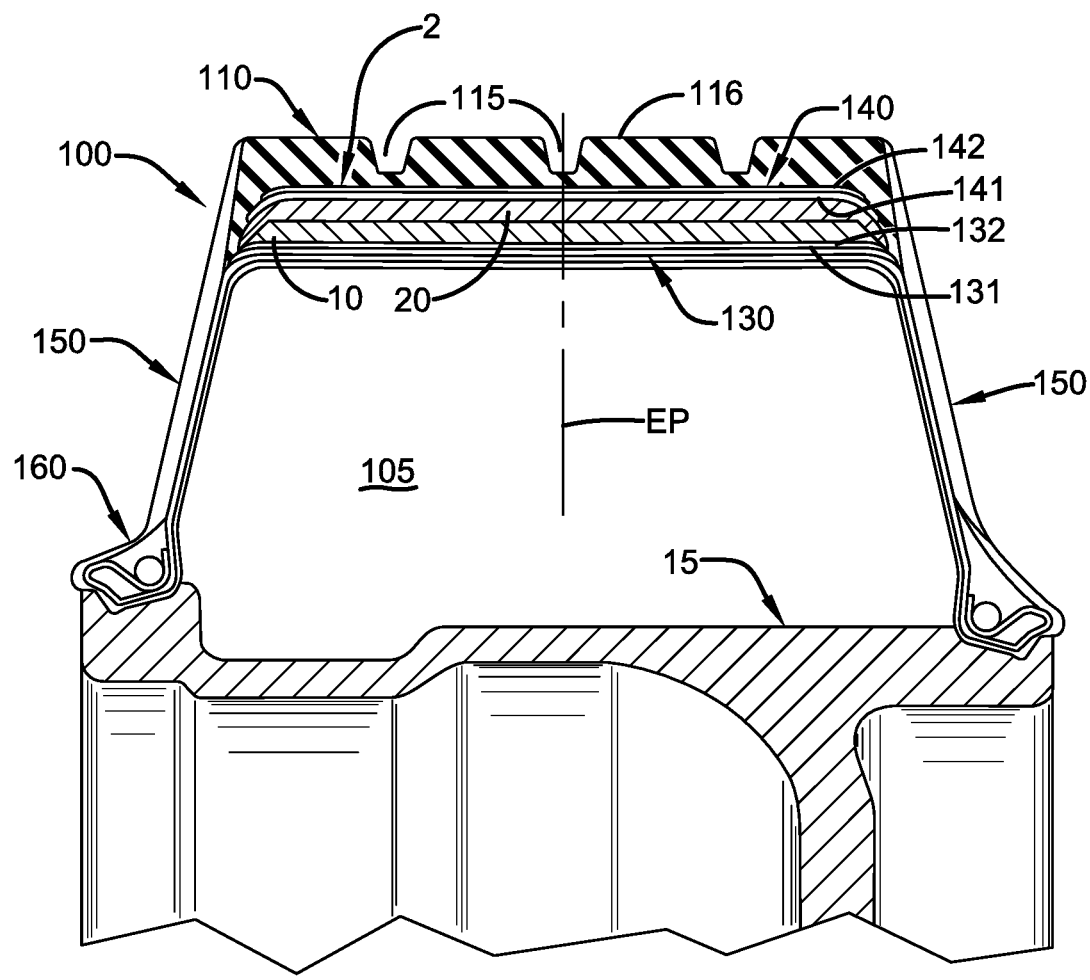
FIG. 3 is a schematic cross section view of an example wheel and tire for use with the present invention.

Accordingly, by way of example, an example structurally supported resilient tire 100 for use with the present invention is shown in FIG. 3. The tire 100 may have a ground contacting tread portion 110, two sidewall portions 150 extending radially inward from the tread portion 110, and bead portions 160 at radially inner ends of the sidewall portions 150. The bead portions 160 may anchor the tire 100 to a wheel 15. The tread portion 110, sidewall portions 150, and bead portions 160 may thereby define a hollow, annular space 105.

A reinforced annular shear band 2 may be disposed radially inward of tread portion 110. The annular band 2 may include a composite of two shear layers 10, 20. Although only two layers 10, 20 are shown, it should be understood that more layers may be used. The annular band 2 may further include a first membrane 130 having two reinforced layers 131, 132 adhered to a radially innermost extent of the shear layer 10, and a second membrane 140 having reinforced layers 141 and 142 that are adhered to a radially outermost extent of the shear layer 20.

The tread portion 110 may have no grooves or may have a plurality of longitudinally oriented tread grooves 115 forming essentially longitudinal tread ribs 116 therebetween. Ribs 116 may be further divided transversely or longitudinally to form a tread pattern adapted to the usage requirements of a particular vehicle and/or weather application. The tread grooves 115 may have a depth consistent with the intended use and/or conditions of the tire 100. The second membrane 140 may be radially offset inward from a bottom of the tread grooves 115 a sufficient distance to protect the structure of the second membrane from cuts and small penetrations of the tread portion 110. The offset distance may be increased or decreased depending on the intended use and/or conditions of the tire 100. For example, a heavy truck tire may use an offset distance of about 5.0 mm to 7.0 mm.

Each of the layers 131, 132, 141, 142 of the first and second membranes 130, 140 may include effectively inextensible cord reinforcements embedded within an elastomeric coating. The membranes 130, 140 may be adhered to the shear layers 10, 20 by vulcanization of the materials. The membranes 130, 140 may be adhered to shear layers 10, 20 by any suitable method of chemical and/or adhesive bonding or mechanical fixation. Each of the shear layers 10, 20 may be constructed from a variety of materials, such as rubber, polyurethane, and/or thermoplastic elastomers. The materials may be adhered to each other by any suitable method of bonding or mechanical fixation.

Figure 4:
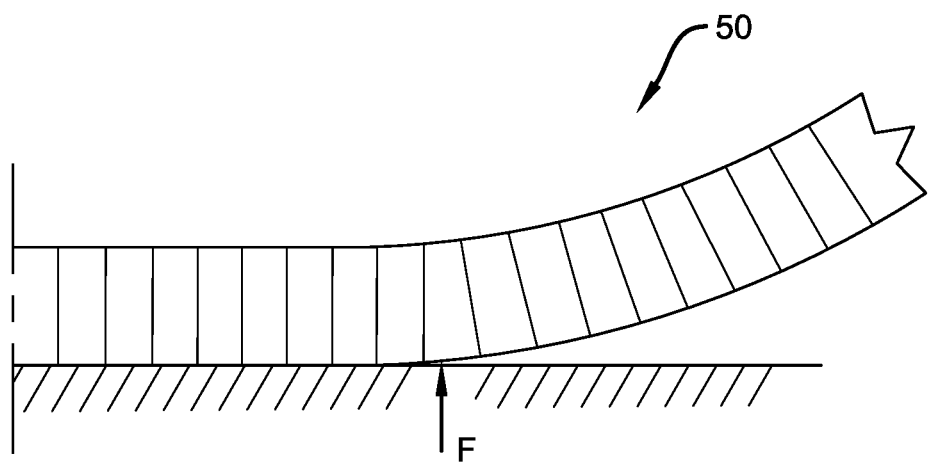
FIG. 4 is a schematic diagram illustrating the ground reaction forces for one example homogeneous shear band.

FIG. 4 illustrates an example rigid annular shear band 50 constructed of a homogeneous material (e.g., a metallic ring) that does not allow for only minimal shear deformation under load. The pressure distribution satisfying the equilibrium force and bending moment requirements may be a pair of concentrated forces F located at each end of the contact area, one end of which is shown in FIG. 4.

Figure 5:
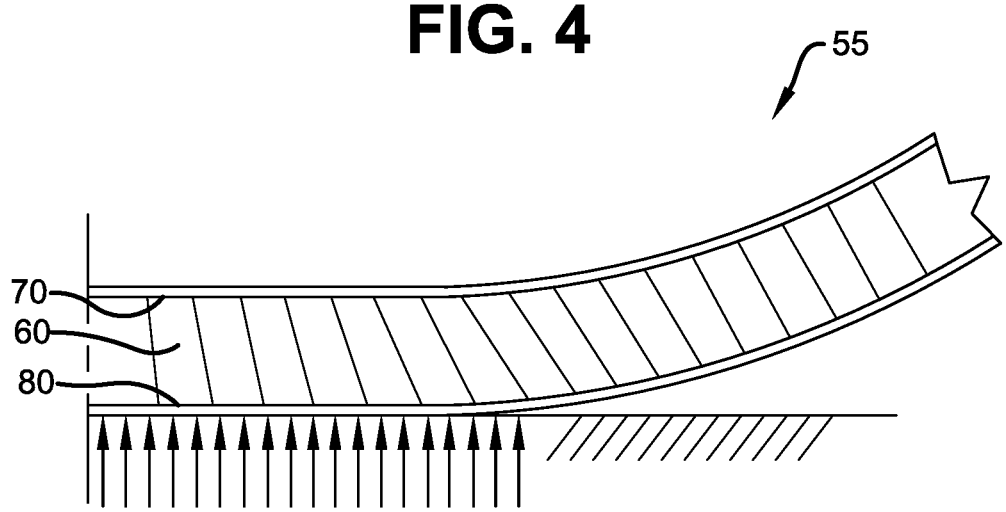
FIG. 5 is a schematic diagram illustrating the ground reaction forces for an example multilayer shear band.

By contrast, FIG. 5 illustrates an example shear band 55 having a single shear layer 60, a radially inner reinforcement membrane 70, and a radially outer reinforcement membrane 80. The structure 55 of FIG. 3 may thus limit shear deformation within the shear layer 60, resulting in a desirable pressure distribution Q in the ground contact region that is substantially uniform. Specifically, when the ratio of the effective tensile modulus of the membranes 70, 80 to the dynamic shear modulus G of the shear layer 60 is sufficiently high (e.g., 100 to 1), shear deformation of the shear band 55 under load may be deformation of the shear layer 60 with little longitudinal extension or compression by the membranes 70, 80, which results in the substantially uniform ground contact pressure distribution Q. When the shear band 55 deforms by shear deformation in the shear layer 60, an advantageous relation may be created allowing one to specify the values of the dynamic shear modulus G of layer 60 and its thickness h for a given application:

$$P_{\mathit{eff}}*R = G*h \qquad (1)$$

Where:
  $P_{\mathit{eff}}$=predetermined ground contact pressure;
  G=dynamic shear modulus of layer 60;
  h=thickness of shear layer 60; and
  R=radial position of the outer membrane 80

$P_{\mathit{eff}}$ and R are design parameters chosen according to the intended use and/or conditions of the tire 100. The above equation then suggests that the product of the dynamic shear modulus G of the shear layer times the radial thickness of shear layer 60 is approximately equal to a product of a predetermined ground contact pressure times a radial position of the outermost extent of the outer membrane 80.

A shear layer that has a desirable $P_{\mathit{eff}}$, a lower thickness h, and a lower rolling resistance RR may be achieved by constructing the shear layer 60 as a composite of different layers made from materials that each have certain individual physical properties. The physical properties of the composite of individual materials may exhibit desired physical properties and an improvement in rolling resistance at a desired thickness of h not possible with only a single shear layer constructed of a single, individual material (FIG. 4).

Figure 6:
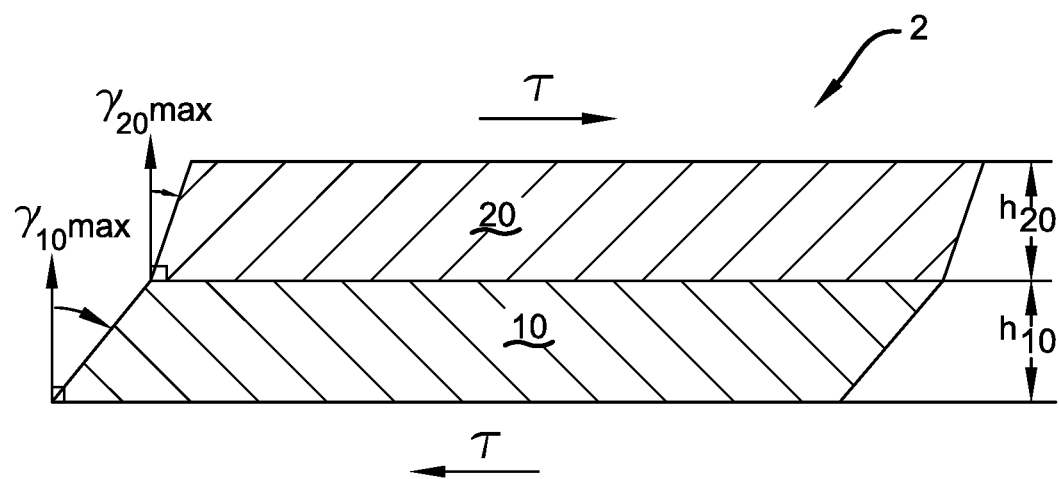
FIG. 6 is a schematic cross section view of an example composite shear band.

Referring to FIG. 6, the example shear band 2 of FIG. 3 may be constructed from two different shear layers 10, 20. The first layer 10 may have a dynamic shear modulus $G_{10}$ and the second layer 20 may have a dynamic shear modulus of $G_{20}$. In FIG. 6, for purposes of discussion, the shear layers 10, 20 are depicted under shear stress τ resulting in a strain in each of the layers. As shown in FIG. 6, each layer 10, 20 is depicted as experiencing a maximum shear strain resulting in maximum shear angles of $\gamma_{10max}$ and $\gamma_{20max}$, respectively. A shear band 2 constructed from the combined shear layers 10, 20 may thus be engineered, through a selection of materials, to exhibit a lower rolling resistance RR and more advantageous physical properties than a non-composite, single layer shear band 50 (FIG. 4).

Relative to the second layer 20, the first layer 10 may be constructed from a softer material with a relatively lower dynamic shear modulus $G_{10}$ that may exhibit low hysteresis even though this material 10 may operate at a relatively higher strain than the second layer 20 for a given shear stress τ.

Figure 7:
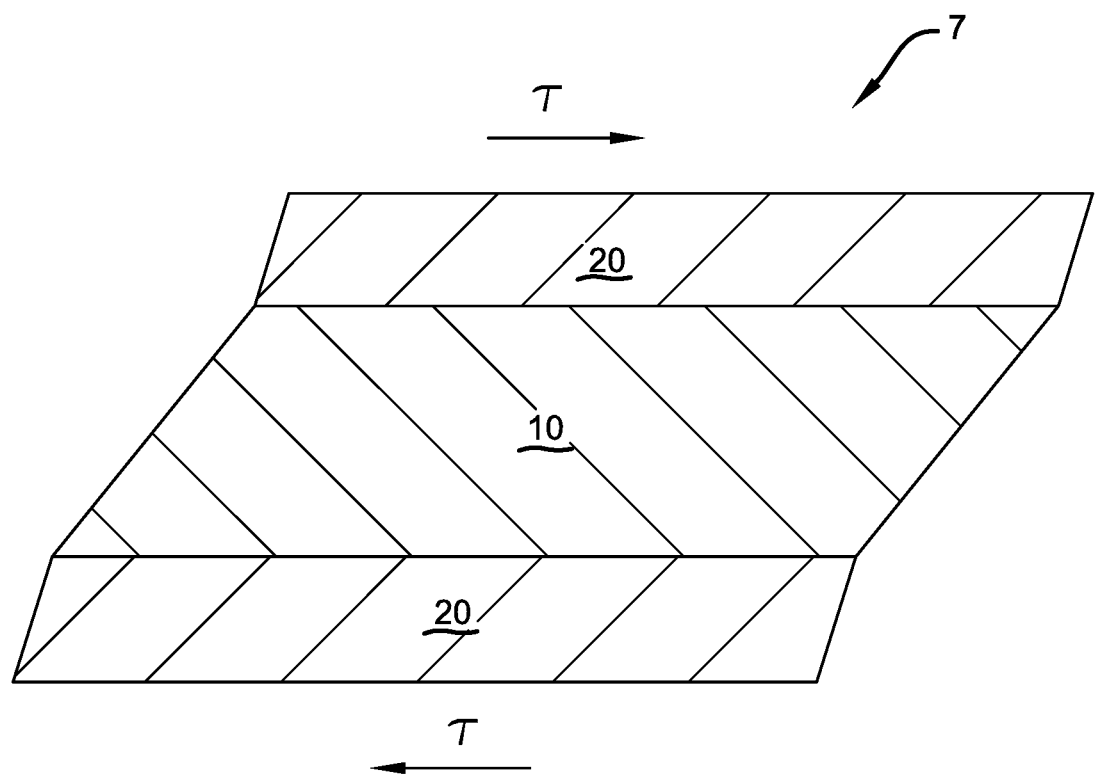
FIG. 7 is a schematic cross section view of another example composite shear band.
Figure 8:
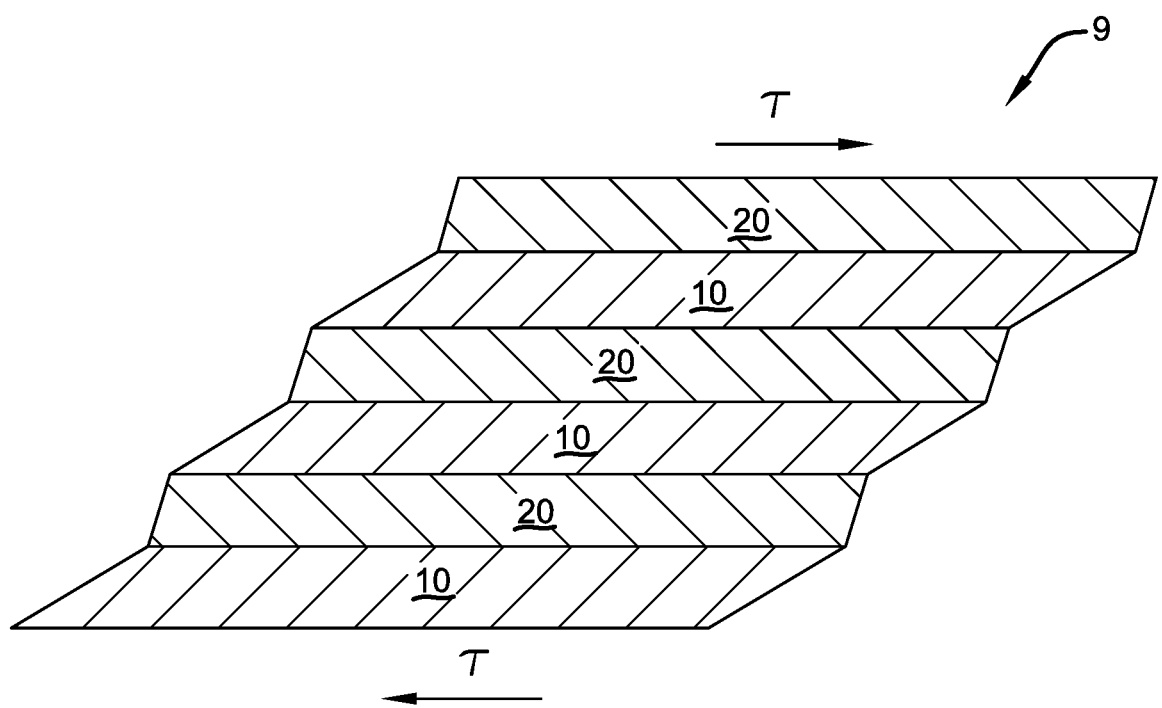
FIG. 8 is a schematic cross section view of still another example composite shear band.

These example shear bands 50, 55 may include more than two layers, as shown in FIG. 7. An example shear band 7 may be constructed from multiple alternating layers 10, 20 of materials having a dynamic shear modulus of either $G_{10}$ or $G_{20}$. Accordingly, FIG. 7 illustrates another example shear band 7 in which the volume fraction of $G_{10}$ and $G_{20}$ may be equal. However, the shear band 7 may be constructed from three layers 10, 20. Two layers 20 having a relatively higher dynamic shear modulus $G_{20}$ may be positioned radially inward and radially outward of a relatively softer layer 10 with a lower dynamic shear modulus $G_{10}$. FIG. 8 illustrates yet another example shear band 9 where multiple alternating layers 10, 20 of selected materials each have a dynamic shear modulus of $G_{10}$ or $G_{20}$.

One current goal in the world-wide tire industry is replacement of existing pneumatic tires with non-pneumatic tires that are lightweight, durable, and require no maintenance. Pneumatic tires have most of the characteristics that make the pneumatic tires so dominant today, such as efficiency at high loads, low contact pressure, low wear, low stiffness, etc. However, a challenge with a pneumatic tire is the requirement for a compressed fluid, rendering it inoperable after a significant loss of inflation pressure. Therefore, an improved non-pneumatic tire is desired that combines the desirable features of pneumatic tires without the need for compressed fluid.

Conventional non-pneumatic tires include a composite structure with three main parts: a rigid (steel) hub, thin deformable spokes, and a shear band. When loaded, the shear band deforms in the contact region and expands in the outer edge (to account for inextensibility of the shear band) that tensions the spokes not in the contact region to carry the load. Thus, from a structural point of view, a shear band may be flexible enough to conform with the loaded shape, as well as durable enough to survive the complex loading (tension, compression, bending or combination of all three) while under load. Further, a lightweight structure with low hysteretic materials may improve fuel economy and rolling resistance.

In accordance with the present invention, a lightweight durable shear band structure 210 may include a flattened, braided tube layer enclosed by a multi-ply laminated belt package 200 to provide lightweight durability and structural integrity. The shear band structure 210 may be radially interposed between a radially outer first metal belt 201 of the belt package 200 and a radially inner second metal belt 202 of the belt package. Unlike conventional shear band designs with metal wire treatments, a fabric reinforced ply structure 210 may be used. The radially adjacent fabric reinforced plies 211, 212, 213 may be placed both at a various angled orientations and/or at 0-degree orientations with reference to the equatorial plane of the tire 100, similar to a conventional angle-ply structure.

Cords, such as aramid, polyethylene naphthalate (poly (ethylene 2,6-naphthalate) (PEN), nylon, hybrid, and/or other suitable cords, may be braided into a flattened, tubular structure, such as structures 2111, 2121, 2131. The tubular structures 2111, 2121, 2131 may further be enhanced with rubber composite layers 2112, 2122, 2132. The tubular structures 2111, 2121, 2131 may then be vulcanized in a closed mold to ensure good penetration of rubber into the tubes 2111, 2121, 2131.

Figure 2:
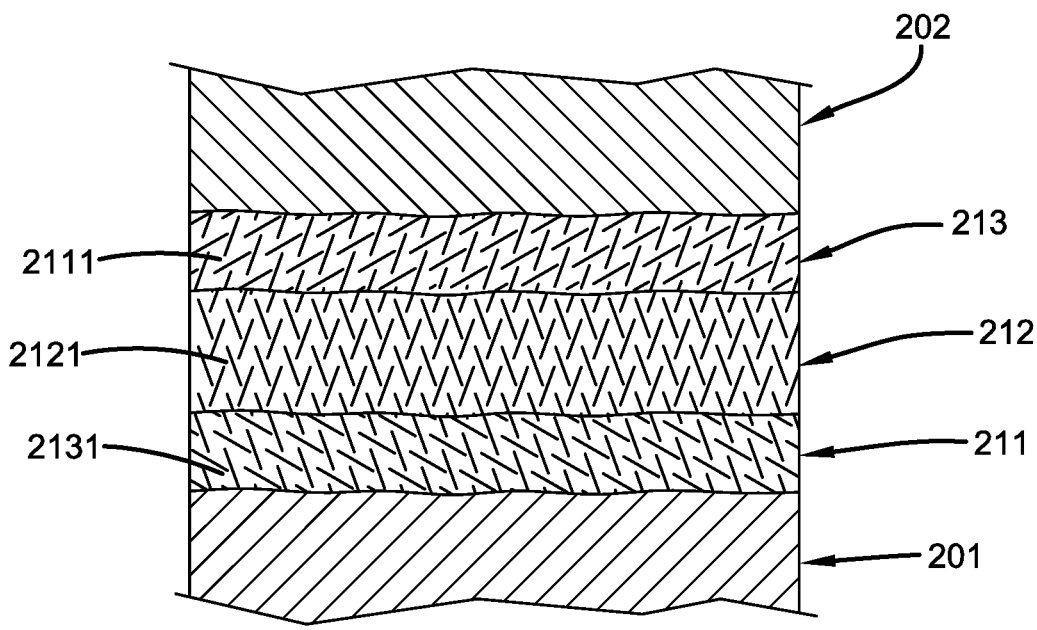
FIG. 2 is schematic view taken along line '2-2' in FIG. 1 of the layers of the example shear band in accordance with the present invention.

The angles of the tubes 2111, 2121, 2131 relative to the equatorial plane of the tire 100 may be varied to tune the overall elongation and stiffness of the shear band 210 (FIG. 2). This may enhance the stiffness of the multiple layers 211, 212, 213 of the shear band 210 in both the circumferential and axial directions of the tire 100. Enclosing the flattened, braided fabric layers 2111, 2121, 2131 with the rubber layers 2112, 2122, 2132 may further enhance the structural integrity of the multiple layers 211, 212, 213 of the shear band 210. A shear band 210 in accordance with the present invention may be fabricated by enclosing the tubes 2111, 2121, 2131 with rubber layers 2112, 2122, 2132, orienting the tubes 2111, 2121, 2131, enclosing all of the multiple layers 211, 212, 213 of the shear band 210 with a fabric layer 215, and curing the shear band 210. Such a cured shear band 210 may demonstrate flexibility to address the bending and compression forces, structural integrity of the shear band, and stiffness of the shear band both in the circumferential and axial directions.

The shear band 210 may be further tuned to meet the application requirements by varying design parameters, such as varying materials of the tubes and rubber layers 2111, 2112, 2121, 2122, 2131, 2132 and/or surrounding structures 201, 202, such as aramid, nylon, polyester, steel, aluminum, carbon, etc., varying densities and/or mechanical structure of the tubers 2111, 2112, 2121, 2122, 2131, 2132, varying the width of the shear band 210, varying the number of shear bands 210, varying widths of multiple shear band layers 211, 212, 213, varying angles of the multiple layers, varying the sequence of the multiple layers and enclosures, etc.

Figure 1:
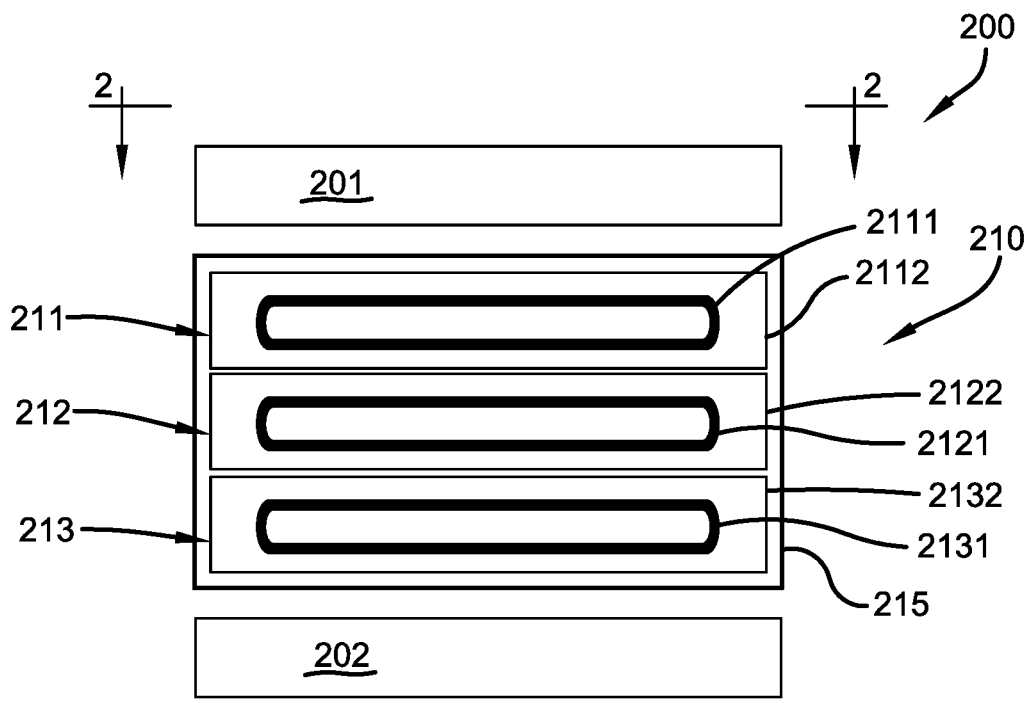
FIG. 1 is a schematic cross section view of an example shear band in accordance with the present invention.

FIG. 1 shows an example belt package 200 in accordance with the present invention. The belt package 200 may include a radially outer first belt layer 201, a radially inner second belt layer 202, and a shear band 210 disposed radially therebetween. The shear band 210 may include a first reinforced ply 211 disposed radially inside the first belt layer 201, a second reinforced ply 212 disposed radially inside the first reinforced ply 211, a third reinforced ply 213 disposed radially inside the second belt layer 202, and a fabric layer 215 enclosing all three reinforced plies 211, 212, 213. The fabric layer 215 may be reinforced with cords angled between −45 degrees and +45 degrees cords, or between −45 degrees and −35 degrees, or between −5 degrees and +5 degrees, or between +35 degrees and +45 degrees relative to the equatorial plane EP of the tire 100. relative to the equatorial plane EP of the tire 100.

The first reinforced ply 211 may include a flattened, braided tube layer 2111 enclosed by a rubber layer 2112. The example flattened, braided tube layer 2111 may be angled between −45 degrees and +45 degrees, or between −45 degrees and −35 degrees (FIG. 2), or between −5 degrees and +5 degrees, or between +35 degrees and +45 degrees relative to the equatorial plane EP of the tire 100. The rubber layer 2112 may be reinforced with cords angled between −45 degrees and +45 degrees, or between −45 degrees and −35 degrees, or between −5 degrees and +5 degrees, or between +35 degrees and +45 degrees relative to the equatorial plane EP of the tire 100.

The second reinforced ply 212 may include a flattened, braided tube layer 2121 enclosed by a rubber layer 2122. The example flattened, braided tube layer 2121 may be angled between −45 degrees and +45 degrees, or between −45 degrees and −35 degrees, or between −5 degrees and +5 degrees (FIG. 2), or between +35 degrees and +45 degrees relative to the equatorial plane EP of the tire 100. The rubber layer 2122 may be reinforced with cords angled between −45 degrees and +45 degrees, or between −45 degrees and −35 degrees, or between −5 degrees and +5 degrees, or between +35 degrees and +45 degrees relative to the equatorial plane EP of the tire 100.

The third reinforced ply 213 may include a flattened, braided tube layer 2131 enclosed by a rubber layer 2132. The example flattened, braided tube layer 2131 may be angled between −45 degrees and +45 degrees, or between −45 degrees and −35 degrees, or between −5 degrees and +5 degrees, or between +35 degrees and +45 degrees (FIG. 2) relative to the equatorial plane EP of the tire 100. The rubber layer 2132 may be reinforced with cords angled between −45 degrees and +45 degrees, or between −45 degrees and −35 degrees, or between −5 degrees and +5 degrees, or between +35 degrees and +45 degrees relative to the equatorial plane EP of the tire 100.

The shear band 210 may have more reinforced plies, similar to the plies 211, 212, 213, angled between −45 degrees and +45 degrees, or between −45 degrees and −35 degrees, or between −5 degrees and +5 degrees, or between +35 degrees and +45 degrees relative to the equatorial plane EP of the tire 100, again similar to the plies 211, 212, 213.

One of ordinary skill in the art will understand that numerous examples of the present invention may be created that fall within present disclosure and claims that follow. It should be understood that the present invention includes various modifications that may be made to the examples described herein that come within the scope of the appended claims and their equivalents.

What is claimed:

1. A tire comprising:
   a first belt layer extending circumferentially around the tire;
   a second belt layer extending circumferentially around the tire; and
   a shear band radially interposed between the first belt layer and the second belt layer, the shear band includes a first reinforcing ply radially adjacent the first belt layer, a third reinforcing ply radially adjacent the second belt layer, and a second reinforcing ply radially interposed between the first reinforcing ply and the second reinforcing ply, the first reinforcing ply including a flattened, braided tube layer enclosed by a first rubber layer, the second reinforcing ply including a second flattened, braided tube layer enclosed by a second rubber layer, the third reinforcing ply including a third flattened, braided tube layer enclosed by a third rubber layer, the second flattened, braided tube layer including a structure angled between −5 degrees and +5 degrees relative to the equatorial plane of the tire.

2. The tire as set forth in claim 1 wherein the first flattened, braided tube layer includes a structure angled between −45 degrees and −35 degrees relative to the equatorial plane of the tire.

3. The tire as set forth in claim 1 wherein the third flattened, braided tube layer includes a structure angled between +35 degrees and +45 degrees relative to the equatorial plane of the tire.

4. The tire as set forth in claim 1 wherein the first rubber layer includes cords angled between +35 degrees and +45 degrees relative to the equatorial plane of the tire.

5. The tire as set forth in claim 1 wherein the second rubber layer includes cords angled between −5 degrees and +5 degrees relative to the equatorial plane of the tire.

6. The tire as set forth in claim 1 wherein the third rubber layer includes cords angled between −45 degrees and −35 degrees relative to the equatorial plane of the tire.

7. The tire as set forth in claim 1 wherein the first belt layer includes metal cords angled between +35 degrees and +45 degrees relative to the equatorial plane of the tire.

8. The tire as set forth in claim 1 wherein the second belt layer includes metal cords angled between +35 degrees and +45 degrees relative to the equatorial plane of the tire.

9. The tire as set forth in claim 1 wherein the first belt layer and the second belt layer both include metal cords angled between −5 degrees and +5 degrees relative to the equatorial plane of the tire.

* * * * *